(12) United States Patent
Hinohara et al.

(10) Patent No.: US 9,906,570 B2
(45) Date of Patent: Feb. 27, 2018

(54) SESSION CONTROL SYSTEM, COMMUNICATION TERMINAL, COMMUNICATION SYSTEM, SESSION CONTROL METHOD, AND MEDIUM

(71) Applicants: Hiroshi Hinohara, Kanagawa (JP); Takahiro Asai, Kanagawa (JP)

(72) Inventors: Hiroshi Hinohara, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 161 days.

(21) Appl. No.: 14/851,192

(22) Filed: Sep. 11, 2015

(65) Prior Publication Data

US 2016/0088027 A1    Mar. 24, 2016

(30) Foreign Application Priority Data

Sep. 19, 2014    (JP) ................................ 2014-190681

(51) Int. Cl.
G06F 15/16    (2006.01)
H04L 29/06    (2006.01)
H04L 29/08    (2006.01)

(52) U.S. Cl.
CPC .... H04L 65/1069 (2013.01); H04L 29/06326 (2013.01); H04L 65/4084 (2013.01); H04L 67/141 (2013.01)

(58) Field of Classification Search
CPC .................. H04L 29/06319–29/06326; H04L 29/08576–29/08594; H04L 61/1529;

(Continued)

(56) References Cited

U.S. PATENT DOCUMENTS 7,456,858 B2    11/2008    Schrader et al.
7,831,715 B2 *    11/2010    Yoshimi ................ H04L 67/141
370/230

(Continued)

FOREIGN PATENT DOCUMENTS

EP    2 059 084 A1    5/2009
JP    4378651    12/2009

(Continued)

OTHER PUBLICATIONS

Extended European Search Report dated Jan. 25, 2016 in Patent Application No. 15184998.1.

*Primary Examiner* — Brendan Higa
(74) *Attorney, Agent, or Firm* — Oblon, McClelland, Maier & Neustadt, L.L.P.

(57) ABSTRACT

A session control system controls establishing a session to transmit contents data between communication terminals, in a communication system including multiple relay management devices managing relaying the contents data transmitted from the communication terminals. The session control system includes a selection unit configured to select one of the relay management devices to manage relaying the contents data, every time the session is to be established; and a transmitter unit configured to transmit selection information representing the relay management device selected by the selection unit, at least to the communication terminals being connected with the relay management devices different from the relay management device selected by the selection unit, among the communication terminals to be participating in the session to be established.

12 Claims, 10 Drawing Sheets

(58) Field of Classification Search
CPC .............................. H04L 67/14–67/141; H04L 65/1066–65/1069; H04M 7/0024
See application file for complete search history.

(56) References Cited

U.S. PATENT DOCUMENTS

| | | | |
|---|---|---|---|
| 8,964,713 | B2 | 2/2015 | Hinohara et al. |
| 2001/0039586 | A1* | 11/2001 | Primak ............... H04L 67/1008 709/228 |
| 2003/0033428 | A1* | 2/2003 | Yadav .................... H04L 29/06 709/238 |
| 2008/0175263 | A1 | 7/2008 | Chen et al. |
| 2009/0122774 | A1 | 5/2009 | Seok et al. |
| 2012/0210416 | A1* | 8/2012 | Mihelich ............. H04L 63/0218 726/11 |
| 2012/0254389 | A1* | 10/2012 | Amemiya ........... H04L 67/1027 709/223 |
| 2013/0170344 | A1 | 7/2013 | Crowe et al. |
| 2013/0246507 | A1* | 9/2013 | Amemiya ........... H04L 67/2814 709/203 |
| 2013/0278712 | A1 | 10/2013 | Maeda et al. |
| 2014/0015917 | A1* | 1/2014 | Kato ........................ H04N 7/15 348/14.12 |
| 2014/0240441 | A1 | 8/2014 | Hinohara et al. |
| 2014/0240449 | A1 | 8/2014 | Hinohara et al. |
| 2014/0240770 | A1 | 8/2014 | Hinohara et al. |
| 2015/0237089 | A1 | 8/2015 | Hinohara et al. |

FOREIGN PATENT DOCUMENTS

| WO | WO 2012/086844 A1 | 6/2012 |
|---|---|---|
| WO | WO 2013/090426 A1 | 6/2013 |

\* cited by examiner

FIG.6A

| COMMUNICATION ID | PASSWORD |
|---|---|
| 01aa | aaaa |
| ... | ... |
| 01ba | baba |
| ... | ... |

FIG.6B

| COMMUNICATION ID | TERMINAL NAME | OPERATIONAL STATE | COMMUNICATION STATE | SESSION ID, DOMAIN INFO | CONNECTED DESTINATION |
|---|---|---|---|---|---|
| 01aa | TERMINAL aa | Online | Busy | S001@tokyo.conf.example.com | TOKYO |
| 01ab | TERMINAL ab | Online | None | None | None |
| 01ba | TERMINAL ba | Offline | Busy | S001@tokyo.conf.example.com | NEW YORK |
| 01bb | TERMINAL bb | Offline | Busy | S001@tokyo.conf.example.com | NEW YORK |
| ... | ... | ... | ... | ... | ... |

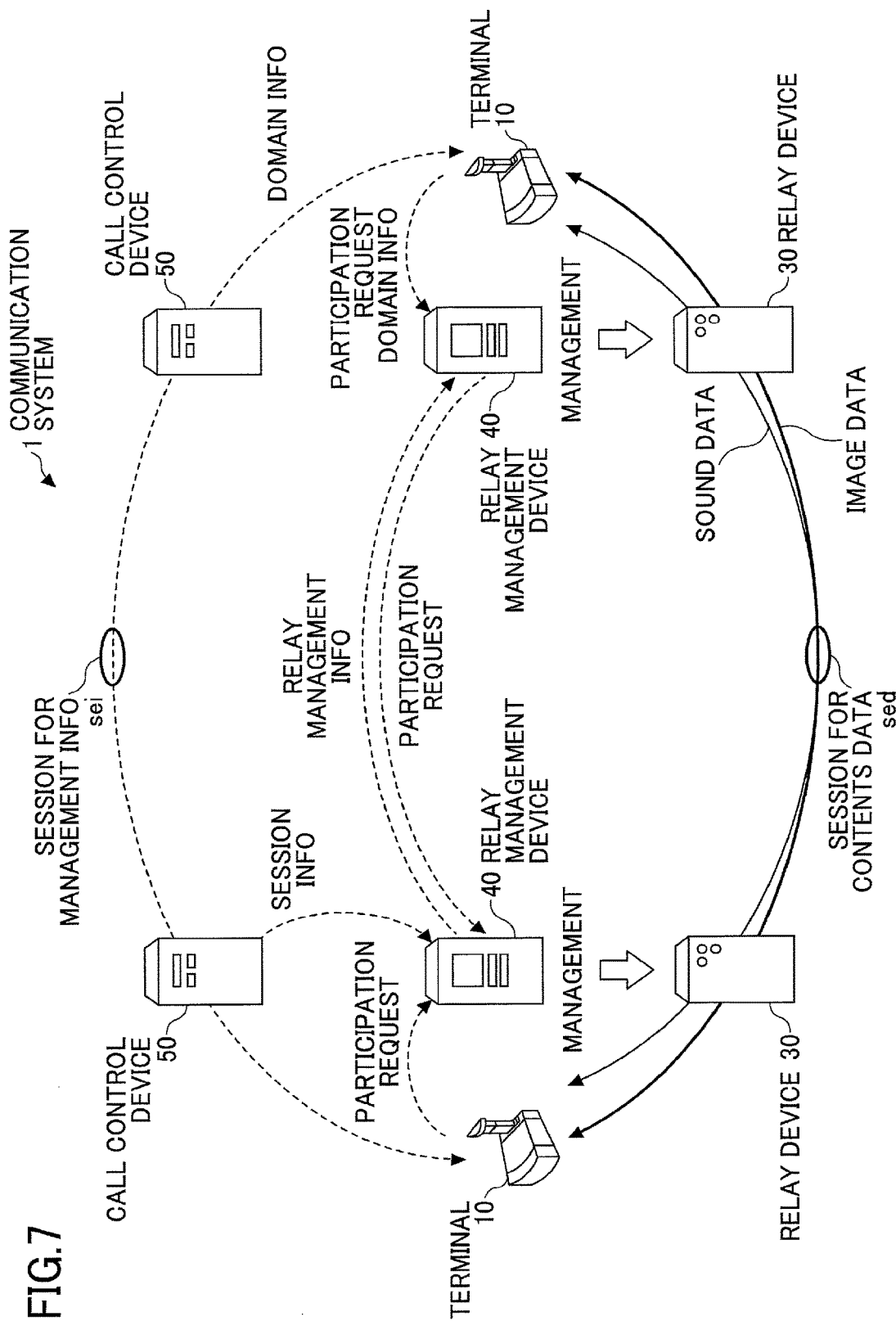

US 9,906,570 B2

SESSION CONTROL SYSTEM, COMMUNICATION TERMINAL, COMMUNICATION SYSTEM, SESSION CONTROL METHOD, AND MEDIUM

BACKGROUND OF THE INVENTION

1. Field of the Invention

The disclosures herein generally relate to controlling establishing a session between communication terminals to transmit the contents data in a communication system that includes multiple relay management devices to manage relaying the contents data transmitted from the communication terminals.

2. Description of the Related Art

In recent years, demand for reducing the cost and time spent for business trips has risen, and a communication system has become popular that is for calls and conferences in which communication is made via a communication network such as the Internet, dedicated lines, and the like. In such a communication system, once a communication is started between communication terminals, contents data such as image data and sound data is transmitted and received so that participants can communicate with each other.

Also, in a communication system for a video conference, other than communication terminals, MCUs (Multipoint Control Units) and a management device to manage the MCUs are provided. An MCU relays contents data, such as image data and sound data, among communication terminals at multiple sites by receiving contents data transmitted from a communication terminal, and transmitting the data to one or more other communication terminals under management by the management device.

SUMMARY OF THE INVENTION

According to an embodiment of the present invention, a session control system controls establishing a session to transmit contents data between communication terminals, in a communication system including multiple relay management devices managing relaying the contents data transmitted from the communication terminals. The session control system includes a selection unit configured to select one of the relay management devices to manage relaying the contents data, every time the session is to be established; and a transmitter unit configured to transmit selection information representing the relay management device selected by the selection unit, at least to the communication terminals being connected with the relay management devices different from the relay management device selected by the selection unit, among the communication terminals to be participating in the session to be established.

According to at least one embodiment of the present invention, when establishing a session to transmit contents data between communication terminals by using multiple relay systems, an effect is obtained that a load can be reduced for a communication terminal on the starting side of a communication, to execute a starting process.

BRIEF DESCRIPTION OF THE DRAWINGS

Other objects and further features of embodiments will be apparent from the following detailed description when read in conjunction with the accompanying drawings, in which:

FIGS. 6A-6B are conceptual diagrams that illustrate management tables managed by a session management device;

FIG. 7 is a conceptual diagram that illustrates a state of transmission and reception of contents data and various management information in a communication system;

DESCRIPTION OF THE PREFERRED EMBODIMENTS

In the following, embodiments of the present invention will be described with reference to the drawings.

<<Overall Configuration of Embodiment>>

Figure 1:
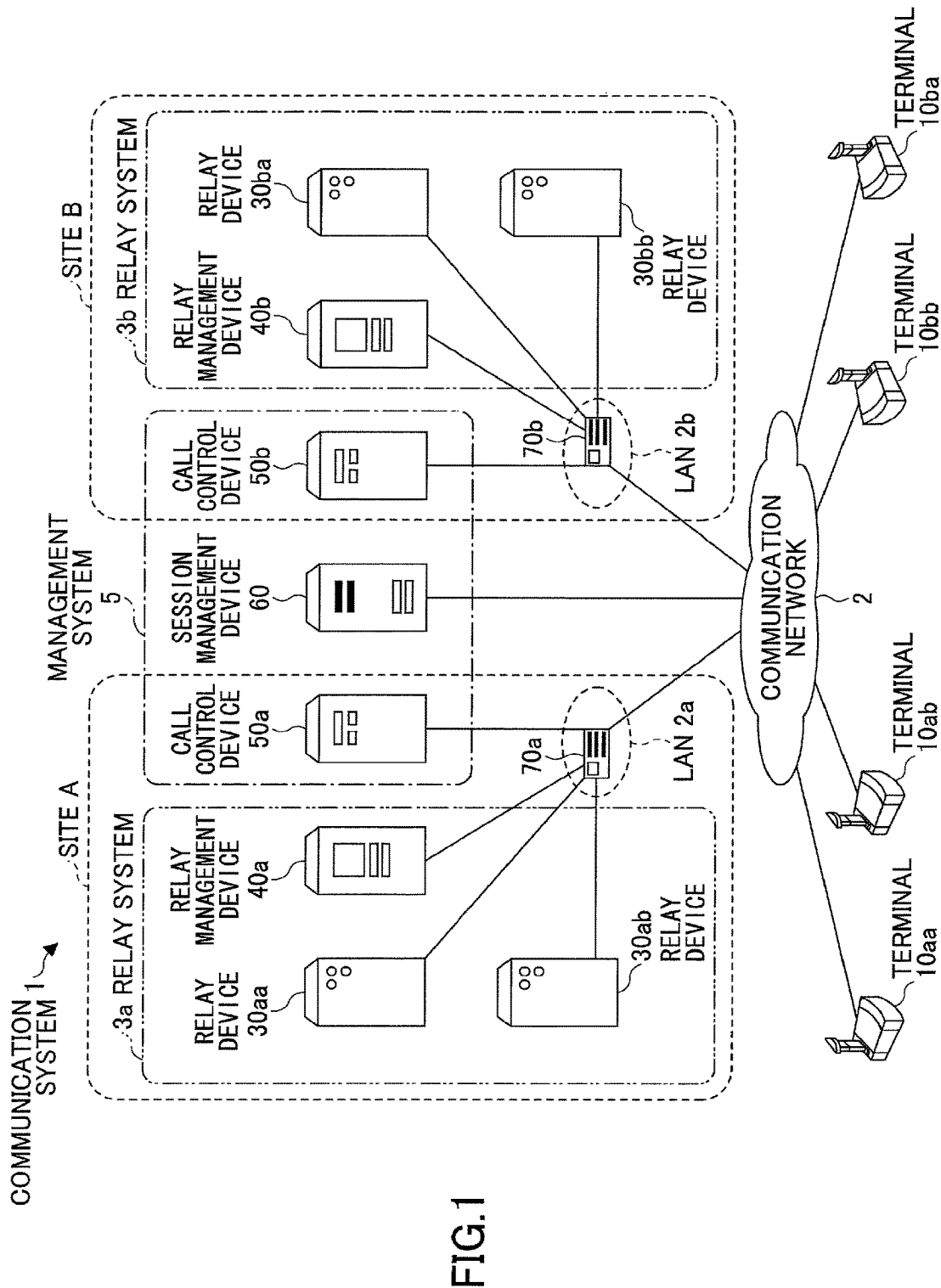
FIG. 1 is an overview of a communication system according to an embodiment of the present invention.

FIG. 1 is an overview of a communication system 1 according to an embodiment of the present invention. As illustrated in FIG. 1, the communication system 1 is configured to include call terminals (10*aa*, 10*ab*, 10*ba*, 10*bb*), for example, video-conference terminals, relay systems (3*a*, 3*b*), and a management system 5. In the following, the call terminals are simply referred to as the "terminal(s)", and when referring to an arbitrary one of the call terminals or the terminal (10*aa*, 10*ab*, 10*ba*, 10*bb*), it will be referred to as the "terminal 10".

The relay system 3*a* is configured to include relay devices (30*aa*, 30*ab*), and a relay management device 40*a*. On the other hand, the relay system 3*b* is configured to include relay devices (30*ba*, 30*bb*), and a relay management device 40*b*. In the following, when referring to an arbitrary one of the relay devices (30*aa*, 30*ab*, 30*ba*, 30*bb*), it will be referred to as the "relay device 30". When referring to an arbitrary one of the relay management devices (40*a*, 40*b*), it will be referred to as the "relay device 40".

The relay device 30 relays contents data such as image data and sound data among multiple terminals 10. Note that an image of image data may be a moving picture or a still picture, or images may include both moving pictures and still pictures.

The relay management device 40 is a computer having a server function. The relay management device 40 manages the relay devices 30 at a site which it belongs to.

The management system 5 is configured to include call control devices (50*a*, 50*b*), and a session management device 60. In the following, when referring to an arbitrary one of the call control devices (50*a*, 50*b*), it will be referred to as the "call control device 50".

The call control device 50 is a computer having a server function. The call control device 50 controls establishing a session (session for contents data "sed") to transmit contents data among the terminal 10 in the communication system 1.

The session management device 60 manages various information items relating to the session for contents data "sed".

The relay devices (30*aa*, 30*ab*), the relay management device 40*a*, and the call control device 50*a* are connected with a LAN 2a (Local Area Network) at a site A to communicate with each other. For example, the site A is a data center in Tokyo.

On the other hand, the relay devices (30ba, 30bb), the relay management device 40b, and the call control device 50b are connected with a LAN 2b (Local Area Network) at a site B to communicate with each other. For example, the site B is a data center in New York.

The devices at the site A and the devices at the site B are connected with the devices at the other site, the session management device 60, and terminals 10 to communicate with each other, via respective routers (70a, 70b) and a communication network 2. The communication network 2 may be the Internet, a cellular phone network, or dedicated lines. For example, by having the devices at the site A and the devices at the site B connected via the communication network 2 constituted by dedicated lines, a communication between the relay devices 30, or between the call control devices 50 can be stabilized.

Note that the session management device 60 may be installed at the site A or the site B, and may be connected with one of the LAN 2a and LAN 2b.

By this communication system 1, users of the terminals 10 can make calls with each other. A call may be implemented with sound, video (images), or sound and video (images).

Although to simplify the description, two sites (A, B) and four terminals (10aa, 10ab, 10ba, 10bb) are illustrated in FIG. 1, the communication system 1 may include three or more sites, and may be configured to include five or more terminals 10.

<<Hardware Configuration of Embodiment>>

Figure 2:
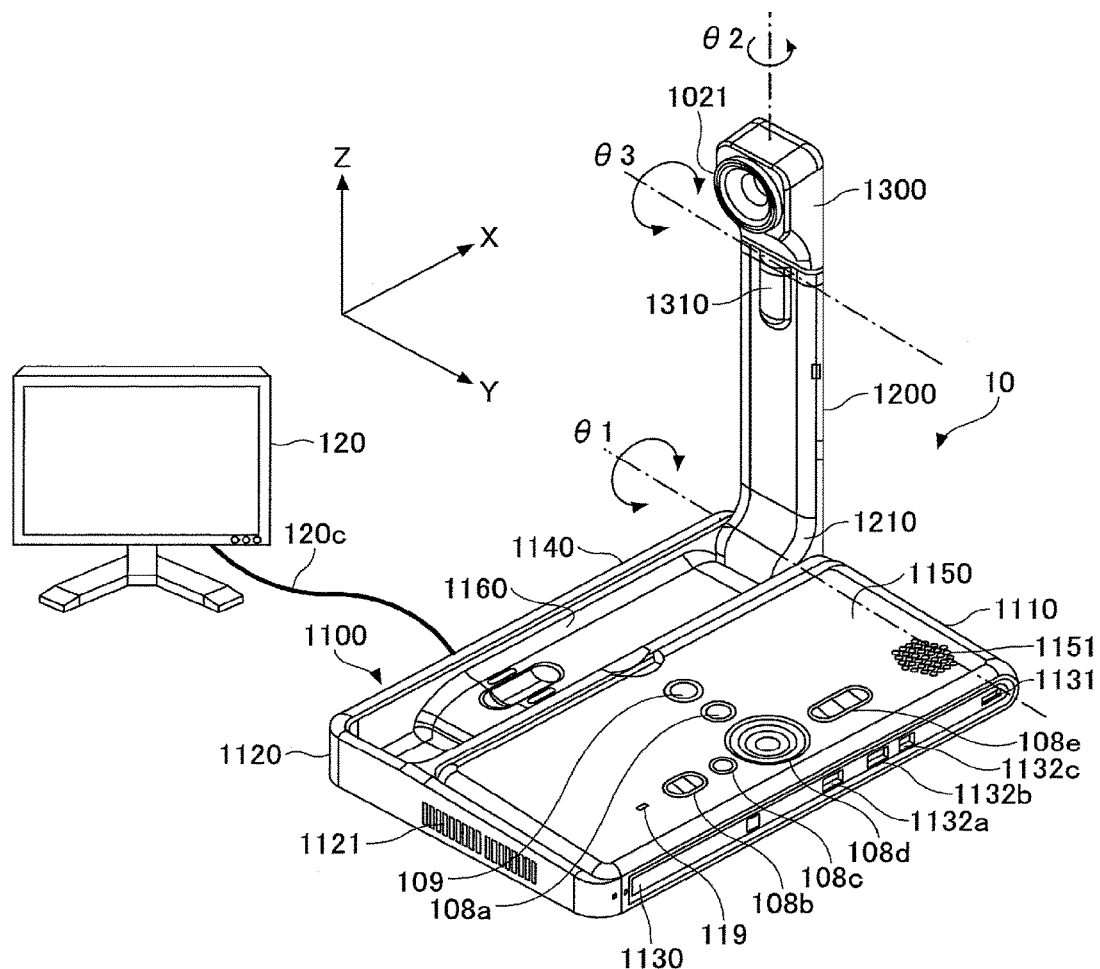
FIG. 2 is an example of an external view of a terminal.

Next, a hardware configuration of the present embodiment will be described. FIG. 2 is an external view of the terminal 10 according to the present embodiment. As illustrated in FIG. 2, the terminal 10 includes a chassis 1100, an arm 1200, and a camera housing 1300. On a front side surface 1110 of the chassis 1100, an air intake surface having multiple air intake holes is provided. On a rear side surface 1120 of the chassis 1100, an air outlet surface having multiple air outlet holes is provided. This structure makes it possible to take in outside air through the air intake holes by driving a cooling fan built in the chassis 1100, and then to exhaust the air on the rear side of the air outlet holes 1121. On a right side surface 1130 of the chassis 1100, a sound pickup hole 1131 is formed, through which voice sound, other sound, noise, and the like are captured by a built-in microphone 114, which will be described later.

On a top surface of the chassis 1100 closer to the right side surface 1130, an operation panel 1150 is formed. On the operation panel 1150, multiple operational buttons 108a-108e, a power switch 109, and an alarm lamp 119 are provided, which will be described later, and a sound output surface 1151 is formed having multiple sound output holes, through which sound output from a built-in loudspeaker 115 goes to the outside, which will be described later. On the top surface of the chassis 1100 closer to a left side surface 1140, a concave-shaped housing part 1160 is formed to accommodate the arm 1200 and the camera housing 1300. On the right side surface 1130 of the chassis 1100, multiple connectors 1132a-1132c are provided to have an external device connection I/F (Interface) 118 electrically connected with a cable, which will be described later. On the other hand, on the left side surface 1140 of the chassis 1100, a connector is provided to have the external device connection I/F 118 electrically connected with a cable 120c for a display 120.

Noted that in the following description, when referring to an arbitrary one of the operational buttons 108a-108e, it will be referred to as the "operational button 108", and when referring to an arbitrary one of the connectors 1132a-1132c, it will be referred to as the "connector 1132".

Next, the arm 1200 is attached to the chassis 1100 via a torque hinge 1210, and is configured so that the arm 1200 can rotate vertically up to 135 degrees of the tilt angle $\theta 1$ relative to the chassis 1100. FIG. 2 illustrates a state of the tilt angle $\theta 1$ set at 90 degrees. The camera housing 1300 has a built-in camera 112, which will be described later, to take a picture of a user, a document, and a room. The camera housing 1300 also has a torque hinge 1310 formed. The camera housing 1300 is attached to the arm 1200 via the torque hinge 1310. The camera housing 1300 can rotate vertically up to $\pm 180$ degrees of the pan angle $\theta 2$, and horizontally up to $\pm 45$ degrees of the tilt angle $\theta 3$, relative to the state of angles formed by the camera housing 1300 and the arm 1200 in FIG. 2 defined as 0 degrees.

Note that the external view in FIG. 2 is just an example, and the embodiment is not restricted to this appearance. The terminal 10 may be, for example, a PC of general use, a smart phone, or a tablet-type terminal. The camera and the microphone do not necessarily need to be built in, but may be attached externally.

Note that the relay device 30, the relay management device 40, the call control device 50, and the session management device 60 have an external view similar to that of a general-purpose server computer, and description of their external view is omitted.

Figure 3:
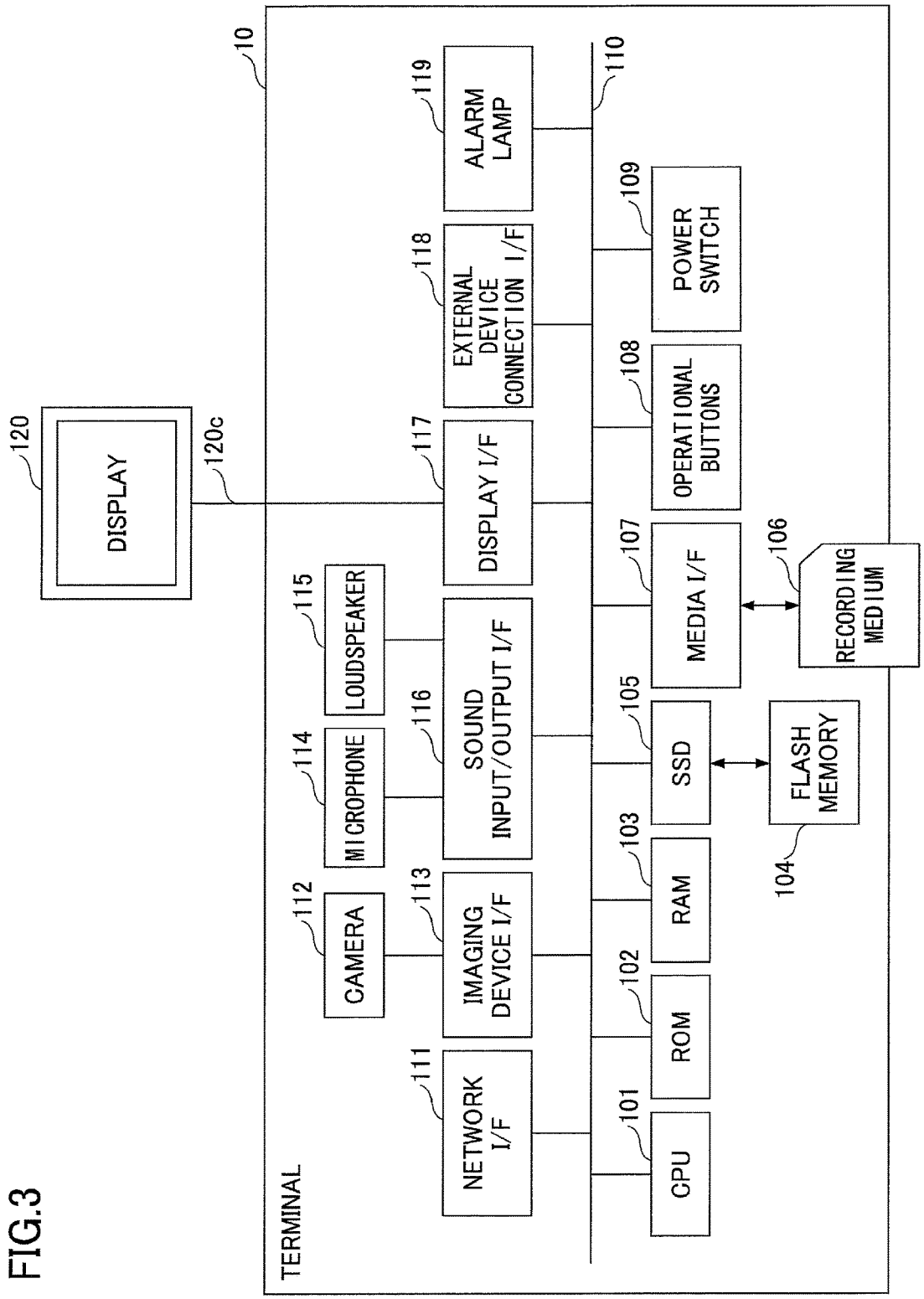
FIG. 3 is a hardware configuration diagram of a terminal.

FIG. 3 is a hardware configuration diagram of the terminal 10 according to the present embodiment. As illustrated in FIG. 3, the terminal 10 in the present embodiment includes a CPU (Central Processing Unit) 101 to control the overall behavior of the terminal 10, a ROM (Read-Only Memory) 102 to store programs to drive the CPU 101 such as an IPL (Initial Program Loader), a RAM 103 used as a work area for the CPU 101, a flash memory 104 to store various programs and data such as image data, audio data, and the like for the terminal 10, an SSD (Solid State Drive) 105 to control writes/reads of various data on the flash memory 104 under control of the CPU 101, a media I/F 107 to control writes/reads of data on a recording media 106 such as a flash memory or an IC (Integrated Circuit) card, operational buttons 108 operated when selecting an address or the like, the power switch 109 to turn on and off the power of the terminal 10, and a network I/F 111 to transmit data by using the communication network 2.

The terminal 10 also includes the built-in camera 112 to capture image data by taking a picture of an object under control of the CPU 101, an imaging device I/F 113 to control the camera 112, the built-in microphone 114 to input sound, the built-in loudspeaker 115 to output sound, a sound input/output I/F 116 to input/output audio signals between the microphone 114 and the loudspeaker 115 under control of the CPU 101, a display I/F 117 to transfer image data to the external display 120 under control of the CPU 101, the external device connection I/F 118 to have various external devices connected, and the alarm lamp 119 to indicate abnormalities of various functions in the terminal 10, and a bus line 110 including an address bus, a data bus, and the like to have the above elements electrically connected with each other as illustrated in FIG. 3.

The display 120 is a display unit constituted with an LCD or an organic electroluminescence display to show images of an object, operational icons, and the like. Also, the display 120 is connected with the display I/F 117 via the cable 120c. The cable 120c may be a cable for analog RGB (VGA)

signals, a cable for component video, or a cable for HDMI (High-Definition Multimedia Interface) or DVI (Digital Video Interactive).

The camera 112 includes a solid-state imaging device to convert light into electric charge to obtain an electronic image of an object. As a solid-state imaging device, a CMOS (Complementary Metal Oxide Semiconductor) or a CCD (Charge Coupled Device) may be used.

The external device connection I/F 118 may be connected with an external camera, an external microphone, an external loudspeaker, or the like, via a USB (Universal Serial Bus) cable or the like plugged into the connector 1132 on the chassis 1100. If having an external camera connected, the external camera is driven under control of the CPU 101, with priority over the built-in camera 112. Similarly, if having an external microphone or an external loudspeaker connected, the external microphone or loudspeaker is driven under control of the CPU 101, with priority over the built-in microphone 114 or the built-in loudspeaker 115, respectively.

Note that the recording media 106 can be easily attached to or detached from the terminal 10. Also, instead of the flash memory 104, an EEPROM (Electrically Erasable and Programmable ROM) or the like may be used, as long as it is a non-volatile memory with which reads/writes of data can be executed under control of the CPU 101.

Figure 4:
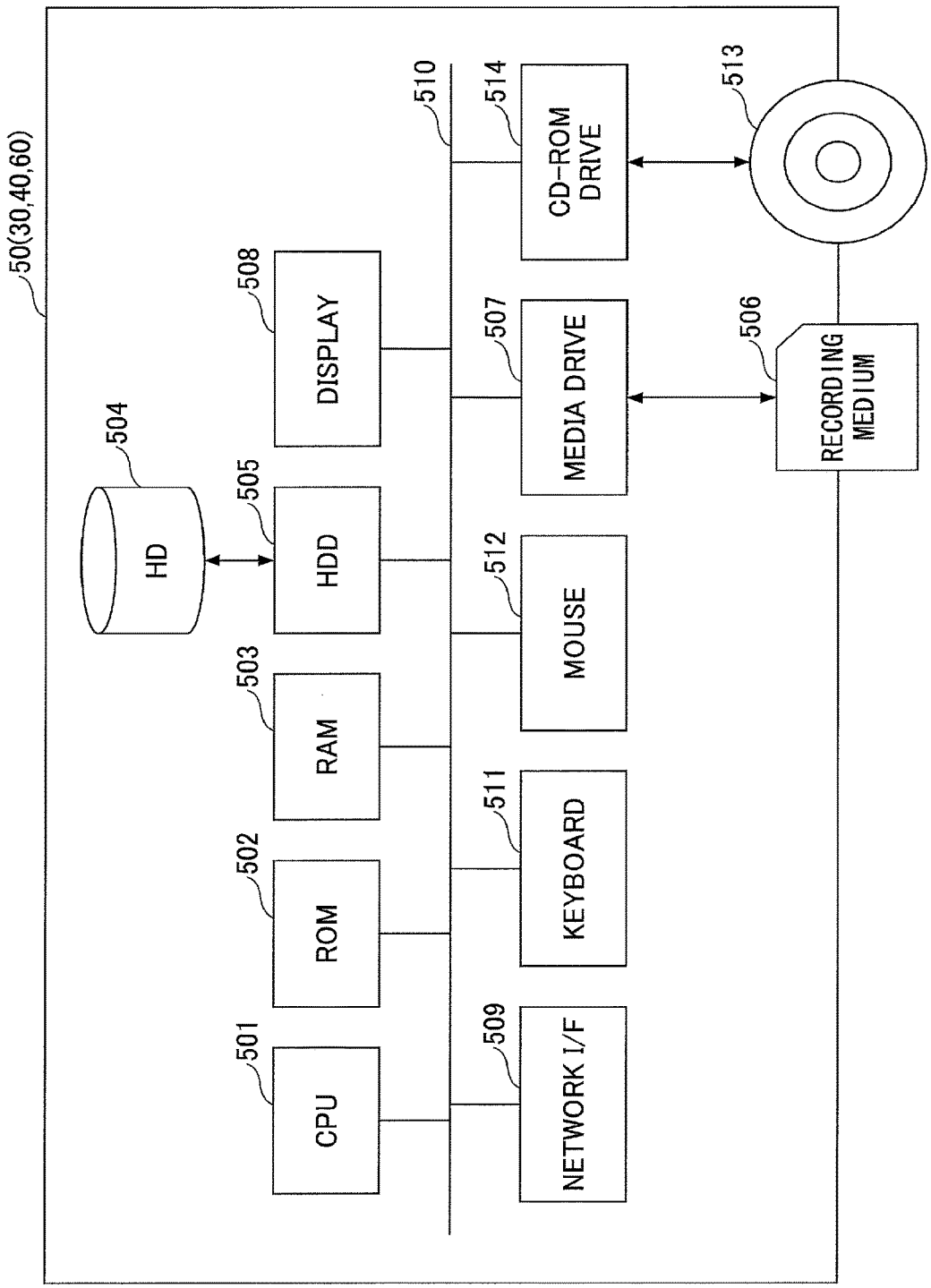
FIG. 4 is a hardware configuration diagram of a call control device.

FIG. 4 is a hardware configuration diagram of the call control device 50. The call control device 50 includes a CPU 501 to control the overall behavior of the call control device 50; a ROM 502 to store programs to drive the CPU 501 such as an IPL; a RAM 503 used as a work area for the CPU 501; an HD (Hard Disk) 504 to store various data of programs for the call control device 50; an HDD (Hard Disk Drive) 505 to control writes/reads of various data on the HD 504 under control of the CPU 501; a media drive 507 to control writes/reads of the data on a recording medium 506 such as a flash memory, a display 508 to display various information items including cursors, menus, windows, characters, and images; a network I/F 509 to transmit data using the communication network 2; a keyboard 511 having multiple keys to enter characters, numerals, various commands, etc.; a mouse 512 for various selections and executions, selection of an object, and moving the cursor; a CD-ROM drive 514 to control writes/reads of data on a CD-ROM (Compact Disc Read-Only Memory) 513, which is an example of a recording medium attached/detached easily; and a bus line 510 including an address bus, a data bus, and the like to have the above elements electrically connected with each other as illustrated in FIG. 4.

The relay device 30, the relay management device 40, the call control device 50, and the session management device 60 have substantially the same hardware configuration as the call control device 50, and their description is omitted.

<<Functional Configuration of Embodiment>>

Figure 5:
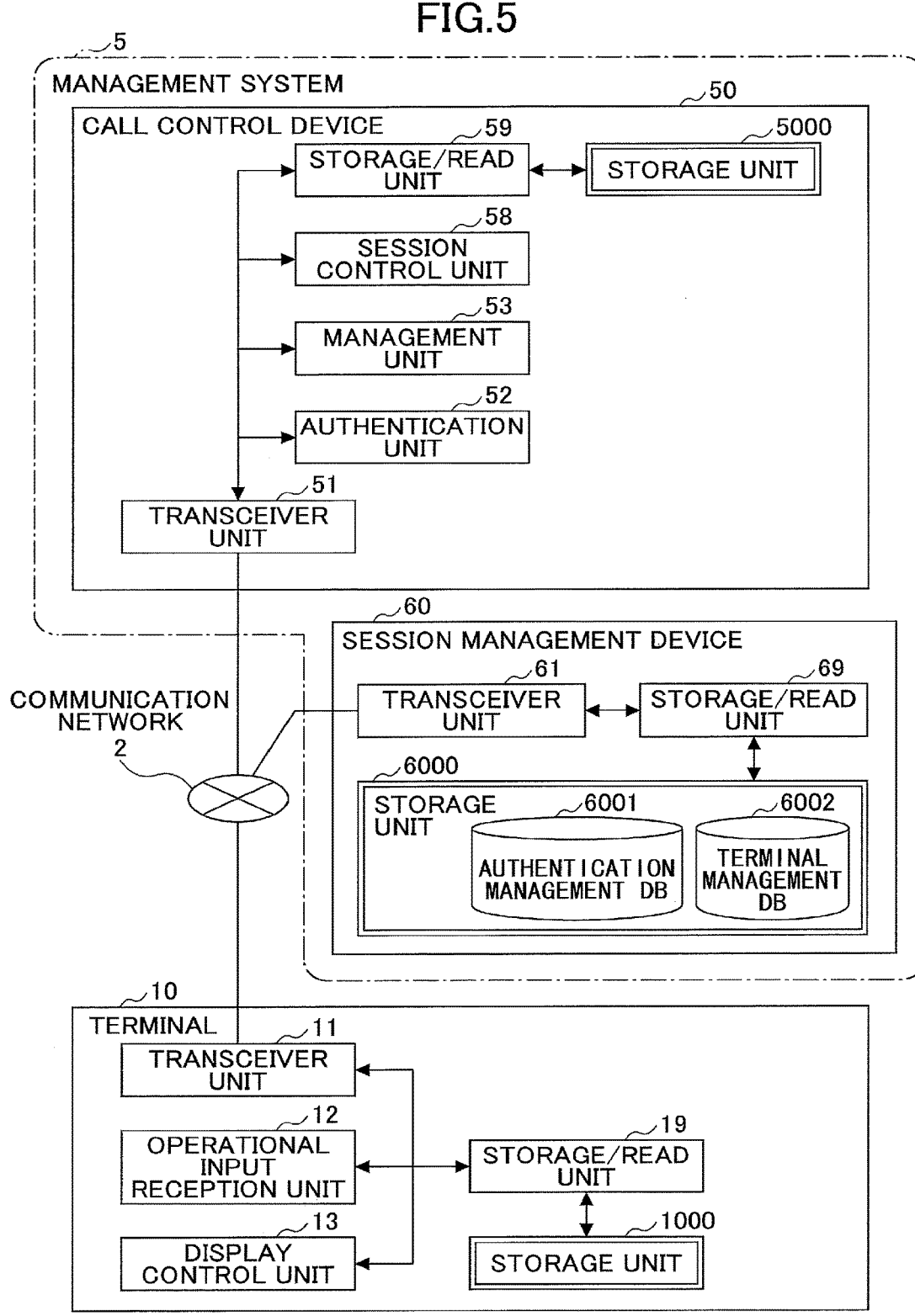
FIG. 5 includes functional block diagrams of a terminal, a call control device, and a session management device.

Next, functional units of the present embodiment will be described. FIG. 5 includes functional block diagrams of the terminal 10, the call control device 50, and the session management device 60 that constitute a part of the communication system 1 according to the present embodiment. In FIG. 5, the terminal 10 and the call control device 50 are connected with each other via the communication network 2 for data communication.

<Functional Configuration of Terminal>

The terminal 10 includes a transceiver unit 11, an operational input reception unit 12, a display control unit 13, and a storage/read unit 19. Functions of these units are implemented by one or more of the elements illustrated in FIG. 3 that operate on instructions from the CPU 101 running a program loaded on the RAM 103 from the flash memory 104. The terminal 10 also includes a storage unit 1000 constituted with the ROM 102, the RAM 103, and the flash memory 104 illustrated in FIG. 3.

(Functional Units of Terminal)

Next, using FIG. 3 and FIG. 5, functional units of the terminal 10 will be described in detail. Note that in describing functional units of the terminal 10 in the following, main units illustrated in FIG. 3 will be also described that are relevant to implement the functional units of the terminal 10.

The transceiver unit 11 of the terminal 10 illustrated in FIG. 5 is implemented by instructions from the CPU 101, and the network I/F 111, to transmit and receive various data (or information) to/from the other terminals, the devices, or the systems via the communication network 2.

The operational input reception unit 12 is implemented by instructions from the CPU 101, the operational buttons (108*a*, 108*b*, 108*c*, 108*d*, 108*e*), and the power switch 109, to receive various inputs from a user, and to receive various selections from the user.

The display control unit 13 is implemented by instructions from the CPU 101, and the display I/F 117, to control transmitting image data received from the counterpart of a call, to the display 120.

The storage/read unit 19 is executed by instructions from the CPU 101, and the SSD 105, or is implemented by instructions from the CPU 101, to store various data in the storage unit 1000, or to extract various data stored in the storage unit 1000.

<Functional Configuration of Call Control Device>

The call control device 50 includes a transceiver unit 51, an authentication unit 52, a management unit 53, a session control unit 58, and a storage/read unit 59. Functions of these units are implemented by one or more of the elements illustrated in FIG. 4 that operate on instructions from the CPU 501 running a program loaded on the RAM 503 from the HD 504. The call control device 50 also includes a storage unit 5000 that is constituted with the HD 504.

(Functional Units of Call Control Device)

Next, functional units of the call control device 50 will be described in detail. Note that in describing functional units of the call control device 50 in the following, main units illustrated in FIG. 4 will be also described that are relevant to implement the functional units of the call control device 50.

The transceiver unit 51 is executed by instructions from the CPU 501, and the network I/F 509, to transmit and receive various data (or information) to/from the other terminals, the devices, or the systems via the communication network 2.

The authentication unit 52 is implemented by instructions from the CPU 501, to look up in an authentication management table (see FIG. 6A) by a search key of a communication ID and a password received by the transceiver unit 51, to determine whether the same communication ID and password are managed in this authentication management table, to authenticate a terminal 10.

The management unit 53 is implemented by instructions from the CPU 501, to manage terminals 10 in a terminal management table (see FIG. 6B) by having pairs of communication IDs and terminal names of the respective terminals 10 associated with operational states and the like of the terminals 10.

The session control unit 58 is implemented by instructions from the CPU 501, to control a communication session "sed" in which contents data is transmitted among terminals 10. The control includes control for establishing a communication session, control for having a terminal 10 participate in the established communication session, and control for disconnecting the communication session.

The storage/read unit 59 is executed by instructions from the CPU 501, and the HDD 505, or is implemented by instructions from the CPU 501, to store various data in the storage unit 5000, or to extract various data stored in the storage unit 5000.

<Functional Configuration of Session Management Device>

The session management device 60 includes a transceiver unit 61, and a storage/read unit 69. Functions of these units are implemented by one or more of the elements illustrated in FIG. 4 that operate on instructions from the CPU 501 running a program loaded on the RAM 503 from the HD 504. The session management device 60 also includes a storage unit 6000 that is constituted with the HD 504. This storage unit 6000 stores an authentication management DB 6001 including the authentication management table, and a terminal management DB 6002 including the terminal management table, as will be described later in detail.

(Authentication Management Table)

FIG. 6A is a conceptual diagram that illustrates the authentication management table. In this authentication management table, to identify a terminal 10 as a communication destination, a communication ID and a password are managed by being associated with each other. Note that a communication ID here may be an ID stored in a terminal 10 in advance, or an ID input by a user on the terminal 10. Also, it may be an ID read out of a recording medium such as an IC card connected with the terminal 10. If the communication ID is to be input on the terminal 10, the terminal 10 can be identified based on the communication ID, by having the communication ID transmitted from terminal 10 on a login request, associated with the terminal 10 as a requestor of the login request, and managing the association in the management system 5. Note that it is assumed in the following description that the terminals (10aa, 10ab, 10ba, 10bb) have communication IDs "01aa, 01ab, 01ba, 01bb" associated, respectively.

(Terminal Management Table)

FIG. 6B is a conceptual diagram that illustrates the terminal management table. In this terminal management table, the communication ID of a terminal 10 is managed by being associated with the terminal name, an operational state of this terminal 10, a communication state of this terminal 10, a session ID of a session for contents data in which this terminal 10 is participating, domain information of a relay management device 40 that manages relaying contents data as a whole in this session, and information representing a site which the call control device 50 or the relay management device 40 connected with this terminal 10 belongs to.

The transceiver unit 61 is executed by instructions from the CPU 501, and the network I/F 509, to transmit and receive various data (or information) to/from the other terminals, the devices, or the systems via the communication network 2.

The storage/read unit 69 is executed by instructions from the CPU 501, and the HDD 505, or is implemented by instructions from the CPU 501, to store various data in the storage unit 6000, or to read out various data stored in the storage unit 6000.

<<Processes or Operations of Embodiment>>

Next, processes or operations of the terminal 10, the relay system 3, and the management system 5 will be described that constitute the communication system 1 in the present embodiment. First, using FIG. 7, an overview of processes or operations in the communication system 1 will be described. FIG. 7 is a conceptual diagram that illustrates a state of transmission and reception of contents data and various management information in the communication system 1.

As illustrated in FIG. 7, in the communication system 1, a session for management information, referred to as "sei", is established between the terminals 10, via one or more of the call control devices 50, or between the terminal 10 and the call control device 50, to transmit and receive various management information items. Also, between the terminals 10, via one or more of the relay devices 30, a session is established to transmit and receive contents data (image data and sound data). Here, these sessions are collectively referred to as the session for contents data "sed". Namely, the session for contents data "sed" is a session(s) used in a video conference. Based on the session information transmitted from the call control device 50, the relay management device 40 manages the relay device 30 to have the relay device 30 relay contents data through a predetermined path.

Figure 8:
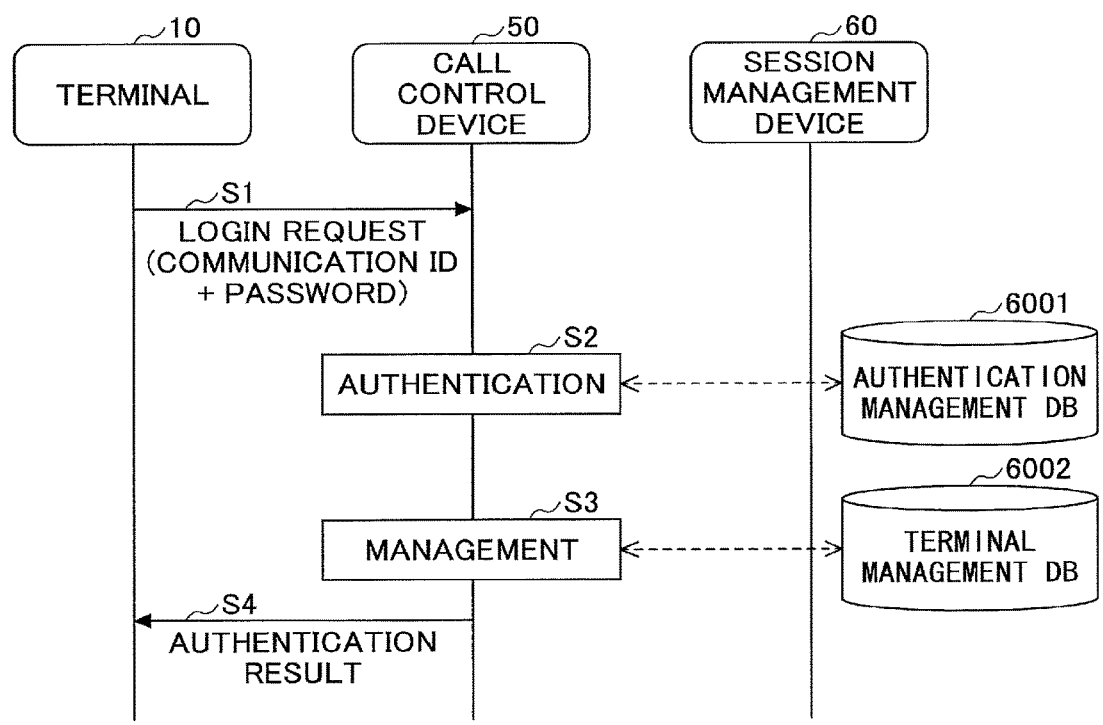
FIG. 8 is a sequence chart that illustrates a process where a terminal logs in on a call control device.

Next, processes or operations will be described in detail for the terminal 10, the relay system 3, and the management system 5 that constitute the communication system 1 in the present embodiment. First, using FIG. 8, a process will be described where the terminal 10 logs in on the call control device 50. FIG. 8 is a sequence chart that illustrates a process where the terminal 10 logs in on the call control device 50.

In the communication system 1, the terminal 10 can make a login request to an arbitrary one of the call control devices 50. A method of selecting a call control device 50 as the destination of a login request is not specifically restricted, but possibly adopted among a method that selects a call control device 50 based on information input on the terminal 10, a method that selects the closest call control device 50 based on physical positional information of the terminal 10, a method that selects a call control device 50 by using GSLB (Global Server Load Balancing), and the like.

The terminal 10 has the transceiver unit 11 make a login request to an arbitrary one of the call control devices 50 (Step S1). This login request includes a communication ID and a password to identify the terminal 10 as the requestor of the login request. Then, the transceiver unit 51 of the call control device 50 receives the login request, and the communication ID and password.

Next, the authentication unit 52 authenticates the terminal 10 as the requestor of the login request, by making a query to the session management device 60 to determine whether the same pair of communication ID and password received by the transceiver unit 51 is managed in the authentication management table (see FIG. 6A) (Step S2). In this case, the transceiver unit 51 of the call control device 50 transmits the communication ID and password transmitted from the terminal 10 as the requestor of the login request, to the session management device 60. The storage/read unit 69 of the session management device 60 looks up in the authentication management table, to confirm whether the pair of communication ID and password transmitted from the call control device 50 is managed in the authentication management table. The transceiver unit 61 of the session management device 60 transmits the confirmation result to the call control device 50.

If the terminal 10 is determined to be valid by this authentication, the management unit 53 makes a request to the session management device 60 via the transceiver unit 51, to manage the communication ID of the requestor of the login request in the terminal management table (see FIG. 6B) to have an operational state of "Online", and the connection destination set (Step S3). Note that in the communication system 1, the terminal 10 is connected with a relay management device 40 that is in the same site as the call control device 50 connected with the terminal 10. Therefore, for example, if the call control device 50 having received the login request is the call control device 50a that is installed in a data center in Tokyo, the management unit 53 makes a request to manage "Tokyo" as the connection destination. In response to the above request, the storage/read unit 69 of the session management device 60 updates the terminal management table.

Next, the transceiver unit 51 transmits an authentication result to the terminal 10 as the requester of the login request (Step S4).

Figure 9:
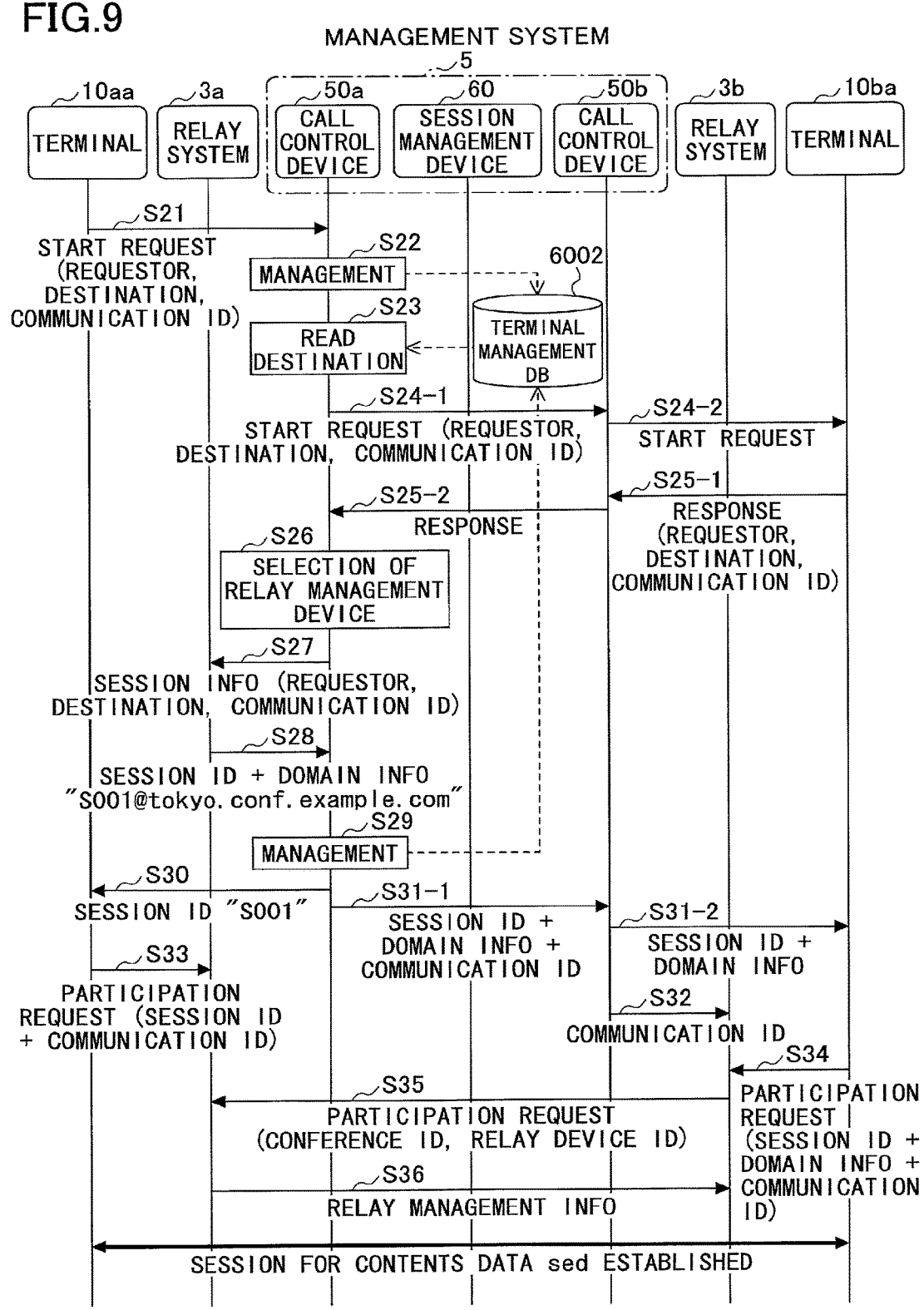
FIG. 9 is a sequence chart that illustrates a process where a session for contents data is established.

Next, using FIG. 9, a process will be described that establishes a session for contents data "sed" between the terminals 10. FIG. 9 is a sequence chart that illustrates a process to establish a session for contents data "sed". In the following, a case will be described where the terminal 10aa, which has been connected with the call control device 50a by the above login process, makes a request for starting a communication with the terminal 10ba, which has been connected with the control device 50b by a login process.

In response to an operation on the operational buttons 108 by a user, the terminal 10aa has the transceiver unit 11 make a request for starting a communication, to the call control device 50a (Step S21). This request for starting a communication includes the communication ID "01aa" of the terminal 10aa as the requester of starting communication, and the communication ID "01ba" of the terminal 10ba as the destination.

The transceiver unit 51 of the call control device 50a receives the request for starting a communication. Next, the management unit 53 of the call control device 50a makes a request to the session management device 60 via the transceiver unit 51, to manage the communication IDs of the terminals (10aa, 10ba) as the requester of starting communication, and the destination, respectively, in the terminal management table (see FIG. 6B), to have communication states set to "Busy" representing that a communication is being executed (Step S22). In response to the request by the call control device 50a, the storage/read unit 69 of the session management device 60 updates the terminal management table.

Next, the session control unit 58 of the call control device 50a makes a query to the session management device 60 via the transceiver unit 51, about the connection destination associated with the communication ID of the terminal 10ba as the destination in the terminal management table (see FIG. 6B) (Step S23). In response to the request, the storage/read unit 69 of the session management device 60 reads the connection destination "New York" associated with communication ID "01ba" of the terminal 10ba as the destination in the terminal management table. The transceiver unit 61 of the session management device 60 transmits the read out connection destination to the call control device 50a.

Next, based on the connection destination transmitted from the session management device 60, the transceiver unit 51 of the call control device 50a transmits a request for starting a communication to the call control device 50b that is installed in a data center in New York (site B) as the connection destination (Step S24-1). This request for starting a communication includes the communication IDs of the terminals (10aa, 10ba) as the requester of starting communication, and the destination. The transceiver unit 51 of the call control device 50b transmits the received request for starting a communication to the terminal 10ba as the destination (Step S24-2).

Having received the request for starting a communication, and depending on input to start the communication by a user, the terminal 10ba as the destination has the transceiver unit 11 transmit a response to indicate permission to start the communication to the call control device 50b (Step S25-1). This response includes the communication IDs of the terminals (10bb, 10aa) as the requester of starting communication, and the destination. The transceiver unit 51 of the call control device 50b transmits the received response to the call control device 50a (Step S25-2).

Having received the response by the transceiver unit 51 of the call control device 50a, the session control unit 58 selects one of the relay management devices 40 installed in the communication system 1, to manage relaying contents data as a whole in a session to be established based on this request for starting the communication (Step S26). A method of selecting a relay management device 40 is not specifically restricted, but possibly adopted among a method that selects a relay management device 40 installed at the site with which the terminal 10 as the requester of starting the communication is connected, a method that selects a relay management device 40 installed at the site with which the terminal 10 as the communication destination is connected, a method that selects a relay management device 40 installed at an intermediate position between the site with which the terminal 10 as the requester of starting the communication is connected, and the site with which the terminal 10 as the communication destination is connected, a selection method by a round robin method, a selection method based on a load balancing viewpoint, and the like. In the following description, it is assumed that the relay management device 40a installed at the site A is selected where the site A is connected with the terminal 10aa as the requester of starting communication.

The transceiver unit 51 of the call control device 50a transmits session information about the session for contents data "sed" that is to be established between the terminals (10aa, 10ba) in response to the request by the terminal 10aa, to the relay management device 40a of the relay system 3a. This session information includes at least the communication IDs of the terminals (10bb, 10aa) as the requester of starting communication, and the destination. Having received the session information, the relay management device 40a generates a session ID "S001" to identify the session. Also, the relay management device 40a associates the generated session ID with domain information "tokyo.conf.example.com" that represents the device itself, and transmits the associated session ID to the call control device 50a (Step S28). Note that to make it easier for a user to understand at a terminal 10 to which the session ID is transmitted later, the "session (ID, information)" may be changed to an arbitrary term such as "conference (ID, information)", "conference room (ID, information)", or the like in the communication system 1.

In the call control device 50a having received the session ID and domain information, the management unit 53 makes a request to the session management device 60 via the transceiver unit 51, to manage the communication IDs of the terminals (10bb, 10aa) as the requester of starting communication and the destination to have the session ID and domain information "S001@tokyo.conf.example.com" in the terminal management table (see FIG. 6B) (Step S29). In response to the request from the call control device 50a, the storage/read unit 69 of the session management device 60 updates the terminal management table.

Next, the call control device 50a transmits the session ID "S001" received at Step S28 to the terminal 10aa as the requestor for starting the communication (Step S30). Also, the call control device 50a transmits the session ID and domain information "S001@tokyo.conf.example.com" received at Step S28, and the communication ID of the terminal 10ba as the destination, to the call control device 50b connected with the terminal 10ba as the destination (Step S31-1).

The transceiver unit 51 of the call control device 50b transmits the session ID and domain information "S001@tokyo.conf.example.com", transmitted from the call control device 50a, to the terminal 10ba as the destination (Step S31-2). Also, the transceiver unit 51 of the call control device 50b transmits the communication ID of the terminal 10ba as the destination transmitted from the call control device 50a, to the relay management device 40b constituting the relay system 3b (Step S32).

In the communication system 1, a terminal 10 connects with a relay management device 40 at the site which the call control device 50 belongs to, with which the terminal is connected. Namely, the terminal 10aa as the requestor for starting the communication makes a connection with the relay management device 40a, by transmitting the communication ID of its own to the relay management device 40a that is installed at the site A which the call control device 50a belongs to, with which the terminal 10aa is connected. Next, the transceiver unit 11 of the terminal 10aa transmits the session ID transmitted from the call control device 50a and the communication ID of its own, to the relay management device 40a, to make a request for participating in the session for contents data "sed" identified by this session ID (Step S33).

Having received the request for participation, the relay management device 40a allocates a relay device 30 to relay contents data in this session among the relay devices 30 under its management, and has the allocated relay device 30 (referred to as the "relay device 30aa", below) connected with the terminal 10aa as the requestor of the participation. This makes it possible for the terminal 10aa to transmit contents data generated by itself to the relay device 30aa.

On the other hand, the terminal 10ba as the destination transmits the communication ID of its own to the relay management device 40b that is installed at the site B which the call control device 50b belongs to, with which the terminal 10ba is connected. The relay management device 40b permits the connection if the communication ID transmitted from the terminal 10ba is the same as the communication ID transmitted from the call control device 50b. After having been connected, the transceiver unit 11 of the terminal 10ba transmits the session ID and domain information transmitted from the call control device 50b and the communication ID of its own, to the relay management device 40b, to make a request for participating in the session for contents data "sed" identified by this session ID (Step S34).

Having received the request for participation, the relay management device 40b allocates a relay device 30 to relay contents data in this session among the relay devices 30 under its management, and has the allocated relay device 30 (referred to as the "relay device 30ba", below) connected with the terminal 10ba as the destination. This makes it possible for the terminal 10ba to transmit contents data generated by itself to the relay device 30ba.

Next, the relay management device 40b transmits a request for participation to the relay device 40b based on the domain information included in the request for participation transmitted from the terminal 10ba (Step S35). This request for participation includes the communication ID and session ID of the terminal 10ba included in the request for participation transmitted from the terminal 10ba, and the relay device ID of the relay device 30ba that has been allocated by itself.

The relay management device 40a transmits relay management information used for managing relaying contents data, to the relay management device 40b. This relay management information includes information about a relay destination of contents data to be relayed by the relay device 30ba allocated by the relay management device 40b. Based on the relay management information, the relay management device 40b manages the relay device 30ba to transmit the contents data transmitted from the relay device 30aa to the terminal 10ba, and to transmit the contents data transmitted from the terminal 10ba to the relay device 30aa.

On the other hand, based on the relay device ID transmitted from the relay management device 40b, the relay management device 40a manages the relay device 30aa to transmit contents data transmitted from the relay device 30ba to terminal 10aa, and to transmit contents data transmitted from terminal 10aa to the relay device 30ba.

The process described above establishes the session for contents data "sed" to transmit contents data between the terminals (10aa, 10ba) via the relay devices (30aa, 30ba).

Figure 10:
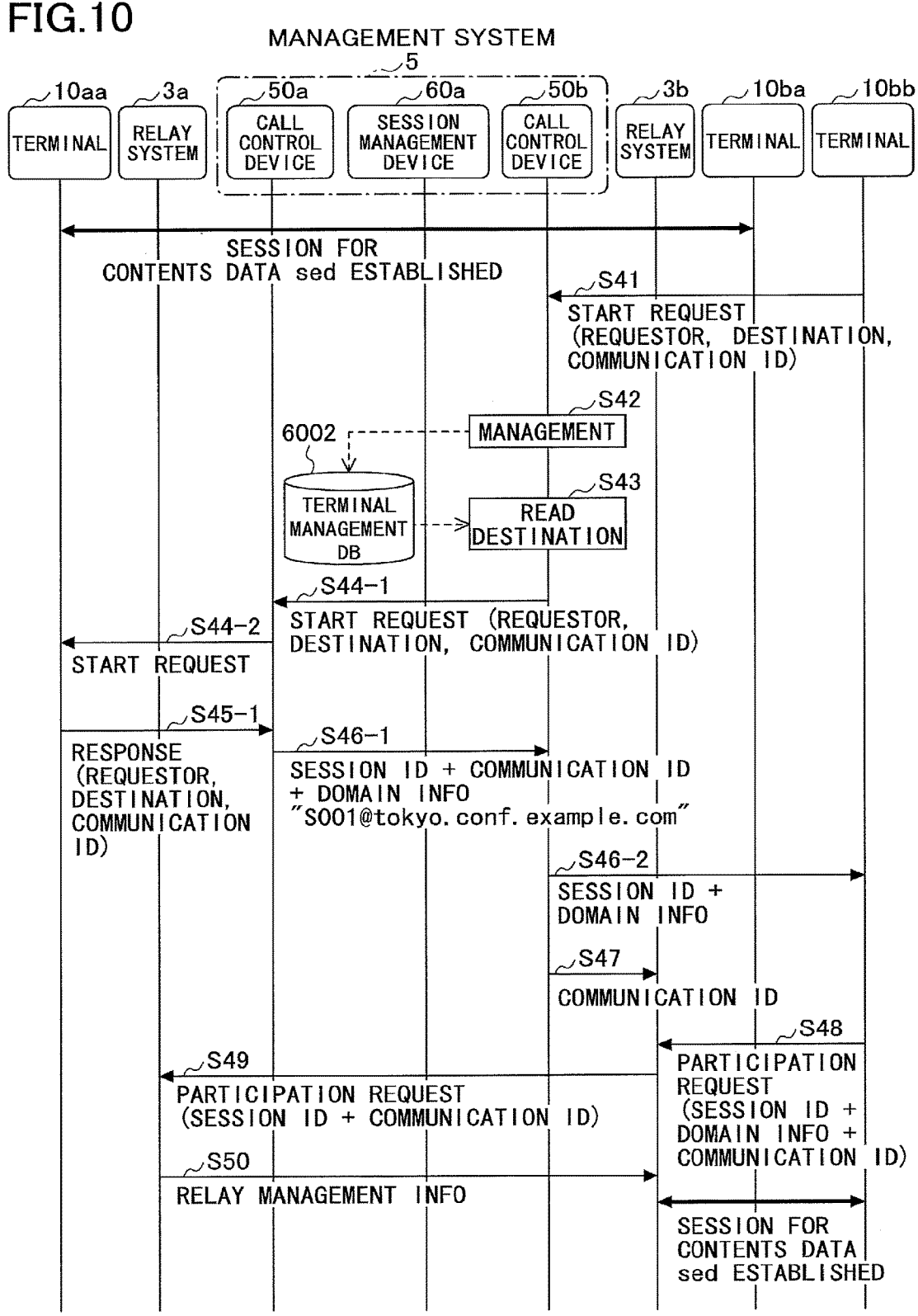
FIG. 10 is a sequence chart that illustrates a process where a terminal participates in a session for contents data "sed".

Next, a process will be described using FIG. 10 in which the terminal 10bb participates in the session for contents data "sed" established between the terminals (10aa, 10ba). Note that FIG. 10 is a sequence chart illustrating a process in which the terminal 10bb participates in the session for contents data "sed". In the following, a case will be described where the terminal 10bb has been connected with the call control device 50b by a login process.

In response to an operation on the operational buttons 108 by a user, the terminal 10bb has the transceiver unit 11 make a request for starting a communication, to the call control device 50b (Step S41). This request for starting a communication includes the communication ID "01ba" of the terminal 10bb as the requestor of starting communication, and the communication ID "01aa" of the terminal 10aa as the destination.

The transceiver unit 51 of the call control device 50b receives the request for starting a communication. Next, the management unit 53 of the call control device 50b makes a request to the session management device 60 via the transceiver unit 51, to manage the communication IDs of the terminals (10aa, 10bb) as the requestor of starting communication, and the destination, respectively, in the terminal management table (see FIG. 6B), to have a communication state of "Busy" (Step S42). In response to the request by the call control device 50b, the storage/read unit 69 of the session management device 60 updates the terminal management table.

Next, the session control unit 58 of the call control device 50b makes a query to the session management device 60 via the transceiver unit 51, about the connection destination associated with the communication ID of the terminal 10aa as the destination in the terminal management table (see FIG. 6B) (Step S43). In response to the request, the storage/read unit 69 of the session management device reads the connection destination "Tokyo" associated with communication ID "01aa" of the terminal 10aa as the destination in the terminal management table. The transceiver unit 61 of the session management device 60 transmits the read out connection destination to the call control device 50b.

Next, based on the connection destination transmitted from the session management device 60, the transceiver unit 51 of the call control device 50b transmits a request for starting a communication to the call control device 50a that is installed in a data center in Tokyo (site A) as the connection destination (Step S44-1). This request for starting a communication includes the communication IDs of the terminals (10bb, 10aa) as the requestor of starting communication, and the destination. The transceiver unit 51 of the call control device 50a transmits the received request for starting a communication to the terminal 10aa as the destination (Step S44-2) Having received the request for starting a communication, and depending on input to start the communication by a user, the terminal 10aa as the destination transmits a response to indicate permission to start the communication to the call control device 50a (Step S45-1).

Having received the response indicating the permission to start, the transceiver unit 51 of the call control device 50a transmits the session ID generated by the relay management device 40a managing contents data, the domain information of the relay management device 40a (see Step S28), and the communication ID of the terminal 10bb as the requestor for starting the communication, to the call control device 50b, in the session for contents data participates (Step S46-1).

The transceiver unit 51 of the call control device 50b transmits the session ID and domain information "S001@tokyo.conf.example.com", transmitted from the call control device 50a, to the terminal 10bb as the destination (Step S46-2). Also, the transceiver unit 51 of the call control device 50b transmits the communication ID of the terminal 10bb transmitted from the call control device 50a, to the relay management device 40b constituting the relay system 3b (Step S47).

The terminal 10bb as the requestor for starting the communication transmits the communication ID of its own to the relay management device 40b that is installed at the site B which the call control device 50b belongs to. The relay management device 40b permits the connection if the communication ID transmitted from the terminal 10bb is the same as the communication ID transmitted from the call control device 50b. After having been connected, the transceiver unit 11 of the terminal 10bb transmits the session ID and domain information transmitted from the call control device 50b and the communication ID of its own, to the relay management device 40b, to make a request for participating in the session for contents data "sed" identified by this session ID (Step S48).

Having received the request for participation, the relay management device 40b allocates a relay device 30ba among the relay devices under its management, to relay contents data in this session for contents data "sed", and has the relay device 30ba connect with the terminal 10bb as the destination. This makes it possible for the terminal 10bb to transmit contents data generated by itself to the relay device 30ba.

Next, the relay management device 40b transmits a request for participation to the relay device 40b, based on the domain information included in the request for participation transmitted from the terminal 10bb (Step S49). This request for participation includes the communication ID and session ID of the terminal 10bb included in the request for participation transmitted from the terminal 10bb, and the relay device ID of the relay device 30ba.

The relay management device 40a transmits relay management information used for managing relaying contents data, to the relay management device 40b. This relay management information includes information about a relay destination of contents data to be relayed by the relay device 30ba allocated by the relay management device 40b. Based on the relay management information, the relay management device 40b manages the relay device 30ba to transmit contents data transmitted from the relay device 30aa to the terminals (10ba, 10bb), to transmit contents data transmitted from the terminal 10ba to the relay device 30aa and terminal 10bb, and to transmit contents data transmitted from the terminal 10bb to the relay device 30aa and terminal 10ba. On the other hand, in response to the request for participation transmitted from the relay management device 40b, the relay management device 40a manages the relay device 30aa to transmit contents data transmitted from the relay device 30ba to terminal 10aa, and to transmit contents data transmitted from the terminal 10aa to the relay device 30ba.

The process described above establishes the session for contents data "sed" to transmit contents data among the terminals (10aa, 10ba, 10bb) via the relay devices (30aa, 30ba).

<<Effects of Embodiment>>

Next, major effects of the above embodiments will be described.

The management system 5 (an example of a session control system) controls establishing a session for contents data "sed" to transmit contents data in the communication system 1 including multiple relay management devices 40 to manage relaying contents data transmitted from terminals 10. The session control unit 58 (an example of a selection unit) of the call control device 50 constituting the management system 5 selects a relay management device 40 to manage relaying contents data among multiple relay management devices 40 for every session for contents data "sed" to be established. The transceiver unit 51 (an example of a transmitter unit) of the call control device 50 transmits domain information of the relay management device 40 selected by the session control unit 58 (an example of selection information representing a selected relay management device), to at least a terminal 10 connected with a relay management device 40 different from the relay management device 40 selected by the session control unit 58, among terminals 10 participating in the session for contents data "sed" to be established.

The terminal 10 having the domain information received can start a session, without receiving information representing a selected relay management device 40 as input from a user, even if not connected with the relay management device 40 selected by the call control device 50, and hence, the load can be reduced for the starting process.

The terminal management DB 6002 (an example of connection information management unit) of the session management device 60 constituting the management system 5 manages a site (an example of connection information representing a relay management device) which the relay management device 40 connected with this terminal 10 belongs to, by associating it with the communication ID of the terminal 10. If the relay management device 40 selected by the session control unit 58 is different from the relay management device 40 represented by the connection destination in the terminal management DB 6002, having been associated with the communication ID of the terminal 10 participating in the session for contents data "sed", the transceiver unit 51 transmits the domain information of the relay management device 40 selected by the session control unit 58 to the terminal 10 participating in the session for contents data "sed".

Thus, even if the terminal 10 is connected with a relay management device 40 that may differ every time a session is to be established, the call control device 50 can transmit domain information appropriately, based on the connection destination managed in the terminal management DB 6002.

The respective transceiver units 51 (an example of multiple login request reception units) of the call control devices (50a, 50b) receive login requests from terminals 10, respectively.

Depending on a transceiver unit (50a, 50b) that has received a login request by a terminal 10, the management unit 53 (an example of connection information management unit) manages a site (for example, Tokyo or New York) which the relay management device 40 belongs to, as the connection destination of the terminal 10 in the terminal management DB 6002.

Thus, even if the terminal 10 is connected with a relay management device 40 that may differ every time a session is to be established, the call control device 50 can transmit domain information to an appropriate terminal 10, based on the connection destination managed in the terminal management DB 6002.

The terminal management DB 6002 (an example of a relay management unit) associates the communication ID (an example of identification information) of the terminal 10, with domain information of the relay management device 40 selected by the session control unit 58, to manage them. The transceiver unit 51 (an example of a start-request reception unit) receives a request for starting a communication between a terminal 10 as a requestor of starting the communication, and a terminal 10 as a destination.

If the relay management device 40 represented by domain information of the relay management device that is managed in the terminal management DB 6002 by having been associated with the communication ID of the terminal 10 as the destination, is different from the relay management device 40 represented by the connection destination that is managed in the terminal management DB 6002 by having been associated with the communication ID of the terminal 10 as the requestor of starting communication terminal 10, the transceiver unit 51 transmits domain information representing the relay management device 40 selected by the session control unit 58 to the terminal 10 as the requestor for starting the communication.

Thus, when receiving a request for starting communication that specifies a terminal 10 participating in a session for contents data "sed" as the destination, the transceiver unit 51 can transmit a request for starting the communication, with the domain information of the relay management device 40 that manages relaying contents data in the session for contents data "sed".

The transceiver unit 11 (an example of a selection information receiver unit) of the terminal 10 receives domain information transmitted by the call control device 50. The transceiver unit 11 (an example of a participation request unit and a selection information transmitter unit) of the terminal 10 transmits domain information to the relay management device 40, with which the terminal 10 itself is connected, when making a request for participating in a session for contents data "sed" to the connected relay management device 40. Thus, the connected relay management device 40 can transmit the request for participation to the relay management device 40 designated by the domain information.

<<Supplementary Features of Embodiment>>

The programs for the terminal 10 and the call control device 50 may be recorded on computer-readable recording media, such as the recording medium 106, to be distributable and as files installable or executable on a computer. Other examples of the recording media include CD-R (Compact Disc Recordable), DVD (Digital Versatile Disk), and Blu-ray Disc.

Also, the call control device 50 in the above embodiments may be installed on a single computer, or may be divided into parts (functional units) to be installed on multiple computers.

Also, the call control device 50 and the session management device 60 may be installed on a single computer.

A recording medium, such as a CD-ROM, or a hard disk that stores the programs according to the embodiments can be offered as a program product domestically or overseas.

Also, although a video-conference terminal has been described as a call terminal as an example of the terminal 10, it is not limited to that as long as mutual communication is possible. For example, the terminal 10 may be an IP (Internet Protocol) telephone, an Internet telephone, or a PC (Personal Computer). Also, the terminal 10 may be a projector, an electronic signboard (digital signage), or an interactive whiteboard.

Furthermore, although the above embodiments have been described about a call made by a terminal (an intermediate concept) such as a video-conference terminal (a subordinate concept), it is not limited to that as long as communication can be made, based on a broader concept including a call. For example, it may be applicable when an application autonomously accesses a server at a data center to transmit or obtain various data. In this case, the counterpart may not be a terminal, but a server. Also, terminals include a game machine and a car navigation device.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can be comprised of any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. (For EP) The computer software can be provided to the programmable device using any conventional carrier medium. The carrier medium can be comprised of a transient carrier medium such as an electrical, optical, microwave, acoustic or radio frequency signal carrying the computer code. An example of such a transient medium is a TCP/IP signal carrying computer code over an IP network, such as the Internet. The carrier medium can also be comprised of a storage medium for storing processor readable code such as a floppy disk, a hard disk, a CD ROM, a magnetic tape device or a solid state memory device. (FOR US) The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile memory or both volatile and non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

RELATED-ART DOCUMENTS

Patent Documents

[Patent Document 1] Japanese Patent No. 4378651

The present application is based on and claims the benefit of priority of Japanese Priority Application No. 2014-190681 filed on Sep. 19, 2014, with the Japanese Patent Office, the entire contents of which are hereby incorporated by reference.

What is claimed is:

1. A session control system, controlling establishing a session to transmit contents data between communication terminals, in a communication system including a plurality of relay management devices managing relaying the contents data transmitted from the communication terminals, comprising:
    selection circuitry configured to select one of the relay management devices to manage relaying the contents data, every time the session is to be established; and
    transmitter circuitry configured to transmit selection information representing the relay management device selected by the selection circuitry, at least to the communication terminals connected to the relay management devices different from the relay management device selected by the selection circuitry, among the communication terminals to be participating in the session to be established.

2. The session control system, as claimed in claim 1, further comprising:
    connection information management circuitry configured to manage, for each of the communication terminals, connection information representing the relay management device connected to the communication terminal, the connection information having been associated with the communication terminal,
    wherein when the relay management device selected by the selection circuitry is different from the relay management device represented by the connection information in the connection information management circuitry, having been associated with the communication terminal participating in the session, the transmitter circuitry transmits the selection information representing the relay management device selected by the selection circuitry to the communication terminal participating in the session.

3. The session control system, as claimed in claim 2, further comprising:
    plurality of login request user interfaces configured to receive login requests by the communication terminals, respectively,
    wherein depending on the login request user interface having received the login request by the communication terminal, the connection information management circuitry manages the connection information representing the relay management device connected to the communication terminal.

4. The session control system, as claimed in claim 2, further comprising:
    selection information management circuitry configured to manage identification information of the communication terminal, and the selection information of the relay management device selected by the selection circuitry, by having the identification information and the selection information associated with each other; and
    start-request reception circuitry configured to receive a request for starting a communication between a communication terminal as a requestor of starting the communication, and a communication terminal as a destination,
    wherein when the relay management device represented by the selection information in the selection information management circuitry, having been associated with the identification information of the communication terminal as the destination, is different from the relay management device represented by the connection information in the connection information management circuitry, having been associated with the communication terminal as the requestor of starting the communication, the transmitter circuitry transmits the selection information representing the relay management device selected by the selection circuitry, to the communication terminal as the requestor for starting the communication.

5. A session control method of controlling establishing a session to transmit contents data between communication terminals, in a communication system including a plurality of relay management devices managing relaying the contents data transmitted from the communication terminals, the method comprising:
    selecting one of the relay management devices to manage relaying the contents data, every time the session is to be established; and
    transmitting selection information representing the one of the relay management devices selected by the selecting, at least to the communication terminals connected to the relay management devices different from the one of the relay management devices selected by the selecting, among the communication terminals to be participating in the session to be established.

6. The session control method, as claimed in claim 5, the method further comprising:
    connection information managing, for each of the communication terminals, connection information representing the relay management device connected to the communication terminal, the connection information having been associated with the communication terminal,
    wherein when the relay management device selected by the selecting is different from the relay management device represented by the connection information in the connection information managing, having been associated with the communication terminal participating in the session, the transmitting transmits the selection information representing the relay management device selected by the selecting to the communication terminal participating in the session.

7. The session control method, as claimed in claim 6, the method further comprising:
    receiving login requests by the communication terminals, respectively, wherein depending on by which of the communication terminals the receiving receives the login request, the connection information managing manages the connection information representing the relay management device connected to the communication terminal.

8. The session control method, as claimed in claim 6, the method further comprising:

selection information managing identification information of the communication terminal and the selection information of the relay management device selected by the selecting by having the identification information and the selection information associated with each other; and receiving a request for starting a communication between a communication terminal as a requestor of starting the communication, and a communication terminal as a destination, wherein when the relay management device represented by the selection information in the selecting, having been associated with the identification information of the communication terminal as the destination, is different from the relay management device represented by the connection information in the connection information managing, having been associated with the communication terminal as the requestor of starting the communication, the transmitting transmits the selection information representing the one of the relay management devices selected by the selecting, to the communication terminal as the requestor for starting the communication.

9. A non-transitory computer-readable recording medium having a program stored therein for causing a computer to execute a process of session control to control establishing a session to transmit contents data between communication terminals, in a communication system including a plurality of relay management devices managing relaying the contents data transmitted from the communication terminals, the process comprising:

selecting one of the relay management devices to manage relaying the contents data, every time the session is to be established; and transmitting selection information representing the one of the relay management devices selected by the selecting, at least to the communication terminals connected to the relay management devices different from the one of the relay management devices selected by the selecting, among the communication terminals to be participating in the session to be established.

10. The non-transitory computer-readable recording medium as claimed in claim 9, the process further comprising:

connection information managing, for each of the communication terminals, connection information representing the relay management device connected to the communication terminal, the connection information having been associated with the communication terminal, wherein when the relay management device selected by the selecting is different from the relay management device represented by the connection information in the connection information managing, having been associated with the communication terminal participating in the session, the transmitting transmits the selection information representing the relay management device selected by the selection circuitry to the communication terminal participating in the session.

11. The non-transitory computer-readable recording medium as claimed in claim 10, the process further comprising:

receiving login requests by the communication terminals, respectively, wherein depending on by which of the communication terminals the receiving receives the login request, the connection information managing manages the connection information representing the relay management device connected to the communication terminal.

12. The non-transitory computer-readable recording medium as claimed in claim 10, the process further comprising:

selection information managing identification information of the communication terminal and the selection information of the relay management device selected by the selecting by having the identification information and the selection information associated with each other; and receiving a request for starting a communication between a communication terminal as a requestor of starting the communication, and a communication terminal as a destination, wherein when the relay management device represented by the selection information in the selecting, having been associated with the identification information of the communication terminal as the destination, is different from the relay management device represented by the connection information in the connection information managing, having been associated with the communication terminal as the requestor of starting the communication, the transmitting transmits the selection information representing the one of the relay management devices selected by the selecting, to the communication terminal as the requestor for starting the communication.

* * * * *